United States Patent [19]
Gozen

[11] Patent Number: 4,962,520
[45] Date of Patent: Oct. 9, 1990

[54] COMPOSITE RINGING AND COIN CONTROL VOLTAGE DETECTOR AND METHOD

[75] Inventor: Yuksel Gozen, Istanbul, Turkey
[73] Assignee: Alcatel NA, Inc., Hickory, N.C.
[21] Appl. No.: 448,069
[22] Filed: Dec. 8, 1989
[51] Int. Cl.[5] .................... H04M 3/02; H04M 17/02; H04M 19/02
[52] U.S. Cl. .................................. 379/29; 379/146; 379/155; 379/353; 379/373
[58] Field of Search ................... 379/27, 29, 146, 150, 379/155, 353, 373, 382, 395, 418

[56] References Cited
U.S. PATENT DOCUMENTS
4,273,963  6/1981  Seidel .................................. 379/395

Primary Examiner—Stafford D. Schreyer
Attorney, Agent, or Firm—Peter C. Van Der Sluys

[57] ABSTRACT

In a telephone system, a composite detection circuit and method for use in mechanized loop testing to detect both AC ringing and DC coin control voltage at a test access unit. An equalization circuit distinguishes between the two voltages and selectively amplifies the DC components of the voltages, thus amplifying the positive DC coin control voltages out of the detection range of the negative AC ringing voltages and vice versa. Two distinct outputs indicate either a positive or negative voltage detected. Two identical circuits are used, one on the ring line and one on the tip line, to detect positive and negative ringing and coin control voltages.

31 Claims, 4 Drawing Sheets

COMPOSITE RINGING AND COIN CONTROL VOLTAGE DETECTOR AND METHOD

BACKGROUND OF THE INVENTION

1. Field of the Invention

The present invention relates to detection circuits and methods for use in telephone systems and, more particularly, to a composite ringing and coin control voltage detection circuit and method for loop testing, wherein the circuit will detect either an AC ringing voltage or a DC coin control voltage without the need for software control or bulky circuitry.

2. Description of the Prior Art

In telephone systems, mechanized loop testing (MLT) is utilized to verify connections between a central office terminal (COT) and a remote terminal (RT) and, additionally, to test circuit functionality at the RT. A test access unit (TAU), which is located at the RT, must be capable of detecting four different ringing voltages (+R, −R, +T and −T) and two distinct coin control voltages (+CC and −CC). ±R may be detected by the TAU on the 'ring' line, while ±T and ±CC may be detected on the 'tip' line at the RT. For each unique signaling state detected by the TAU, an appropriate termination is applied between the tip, ring and ground of the RT channel unit. The termination applied at the RT is sensed at the COT to verify the system's functionality.

As can be seen in Table 1, one of four terminations must be applied at the RT for each of the six different signals which are detected by the TAU. An absorptive termination is applied at the RT when +R is detected on the ring line, while a reflective termination is applied when −R is detected on the ring line. An absorptive positive tip party identification (PTPI) termination is applied at the RT if either +T or +CC is detected on the tip line, and a reflective negative tip party identification (NTPI) is applied if either −T or −CC is detected on the tip line. Thus, the detection circuit at the TAU must be able to distinguish between +R and −R on the ring line and +T (or +CC) and −T (or −CC) on the tip line and output an appropriate logic signal to allow the corresponding termination to be applied.

TABLE 1

| Signal | Signal Line | Termination | Nominal Voltage | DC Offset |
|---|---|---|---|---|
| +R | Ring | Absorptive | 100 VRMS | +48 V |
| −R | Ring | Reflective | 100 VRMS | −48 V |
| +T | Tip | Absorptive PTPI | 100 VRMS | +48 V |
| −T | Tip | Reflective NTPI | 100 VRMS | −48 V |
| +CC | Tip | Absorptive PTPI | +130 VDC | N/A |
| −CC | Tip | Reflective NTPI | −130 VDC | N/A |

As shown in Table 1, each signal appears on either the ring or the tip lines. The ringing signals, +R, −R, +T, and −T are typically 100 VRMS at 20 Hz. +R and +T are offset with approximately +48 VDC, and, conversely, −R and −T are offset with −48 VDC. +CC and −CC are ±130 VDC signals respectively.

The four different signal types (positive and negative offset ringing voltages and positive and negative coin control voltages) to be detected at the TAU are illustrated in the graph in FIG. 1. The signals are displayed in peak-to-peak voltage (in volts) on the vertical, or y, axis 10, with respect to time (in ms) on the horizontal, or x, axis 12. Two sinusoidal lines 14 and 16 represent the positive and negative offset ringing voltages, ±R and ±T, which appear on the ring and the tip lines respectively at the TAU. The two horizontal lines 18 and 20 represent the positive and negative coin control voltages, ±CC. Also shown in dashed lines on the graph are maximum values 22 and 26 and minimum values 24 and 28 for ±R and ±T, and maximum values 30 and 36 and minimum values 32 and 34 for ±CC, which are to be detected at the remote terminal.

As can be seen in FIG. 1, the ringing signal, which is applied to the ring and tip lines, is nominally a 20 Hz, 100 VRMS signal. This AC signal is superimposed on either the positive battery voltage +48 VDC, which is shown as signal 14 (+R or +T), or the negative voltage −48 VDC, or signal 16 (−R or −T). This offset is attributable to the +48 VDC battery source in a telephone system. The AC ringing signals 14 and 16 have a maximum signal level of 120 VRMS, as indicated by dashed lines 22 and 26, respectively, and a minimum signal level of 70 VRMS, as indicated by dashed lines 24 and 28, respectively.

The coin control voltage signals, on the other hand, are DC signals with values of ±130 V as represented by horizontal lines 18 and 20 (+CC and −CC respectively). Dashed lines 30, 32, 34 and 36 represent the maximum and minimum values (±200 VDC and ±70 VDC) for ±CC.

Each of these signals must be detected within its threshold so that the appropriate termination may be applied. Most existing systems require separate detection circuits for detecting the coin control voltages and the ringing voltages, as in Brolin et al, U.S. Pat. No. 4,277,647, which teaches the use of two distinct circuits: a coin control voltage detector and a ringing detector. The prior art systems utilize either bulky discrete analog circuitry or digital circuitry using a microprocessor with elaborate software as the detection means. Additional microprocessor support with software control may be required in some cases. Although those circuits which utilize a microprocessor may save some board space and components, a heavy software programming effort is required, and processor time is wasted.

The amount of detection circuitry utilized in the existing systems would be reduced and simplified if a single, or composite, circuit could be used to detect both the ringing and coin control voltages. However, a problem arises in such composite detection circuits, in that false detection flags may be set. This can most clearly be seen in FIG. 2.

A negative ringing signal 16 (−T) along with minimum and maximum signals 28 and 26 (−Tmin and −Tmax) are shown in FIG. 2. As can clearly be seen, −T 16 may be detected when it crosses a −T detection threshold 38, which is set at the most negative point of −Tmin 28. In a composite circuit, i.e., a circuit which will detect both ±T and ±CC, −T 16 would also trip any threshold which would be used to detect both +CC or −CC because such thresholds must be set, at a minimum, at ±CCmin 32, 34 or ±70 VDC. In such a circuit, both the reflective NTPI termination flag would be set (for −T and −CC) and the absorptive PTPI termination flag would be set (for +CC). Because only the reflective NTPI termination should be set, as shown in Table 1, the absorptive PTPI termination flag would be falsely triggered.

Because of the false detection problem, existing systems utilize either bulky circuitry to discriminate between the two types of signals, or digital circuitry using a microprocessor with complex software for measuring, for example, rise and fall times of the detected signal to discriminate between the AC and DC signals. Naturally, writing and debugging software consumes time, while running the software consumes processor time. Consequently, it would be desirable to utilize a simple composite detection circuit for detecting both ringing and coin control signals without false detection or the need for bulky circuitry or elaborate software.

SUMMARY OF THE INVENTION

The present invention relates to voltage detection circuitry in telephone systems which is used in mechanized loop testing to detect positive and negative ringing voltages on both the ring and the tip lines and for detecting a coin control voltage on the tip line. The present invention uses a single simple circuit which is uniquely adapted to detect either a ringing voltage or a coin control voltage and to generate a corresponding logic voltage so that a proper termination may be applied. The circuit of the present invention is simple, in that it requires no complex hardware and, furthermore, requires no software control. Each circuit, which is applied to both the tip and ring conductors of a telephone line, generates one of two outputs corresponding to an appropriate termination which must be applied for its associated signal. Thus, two identical circuits are utilized, one on the ring line and one on the tip line, for detecting one of six signals and for generating a corresponding logic signal so that one of four terminations may be applied at the RT. This is accomplished with minimal hardware and absolutely no software control.

The present invention achieves this composite detection through the use of an equalization circuit which distinguishes between DC coin control voltages and AC ringing voltages. The circuit selectively amplifies the DC components of the coin control voltages and the ringing signals, while allowing the AC components to retain substantially the same peak-to-peak values. A more positive detection threshold is set such that the circuit will detect either a positive coin control or ringing voltage and will not detect negative AC or DC signals. Furthermore, a more negative detection threshold is set so that only negative coin control and ringing voltages are detected. This allows detection of each individual signal without the risk of false termination flags.

A primary objective of the present invention is to provide a detection circuit for mechanized loop testing of test access units for detecting both a ringing voltage and a coin control voltage.

Another objective of the present invention is to provide a detection circuit which is small, simple and does not require software support.

Another objective of the present invention is to provide a simple composite detection circuit for use on both the ring and tip lines in a telephone circuit which will detect a positive AC ringing or DC coin control voltage and a negative AC ringing or DC coin control voltage and will provide a digital indication thereof.

Another object of the present invention is to provide a method of detecting either a ringing voltage or a coin control voltage.

Another object of the present invention is to provide a simple method of detecting a positive ringing or coin control voltage or a negative ringing or coin control voltage and providing a digital indication thereof.

The above and other objectives and advantages of the invention will become more apparent upon reading a description of the invention in connection with the drawings described below.

DESCRIPTION OF THE PREFERRED EMBODIMENT

The present invention utilizes a gain equalizing network to selectively amplify the DC coin control voltage signal ($\pm$CC) out of the detection range of the AC ringing signal ($\pm$T), as they both may appear on the tip line. This unique feature allows the circuit to distinguish between a negative ringing signal and a positive coin control voltage signal and vice versa.

Figure 1:
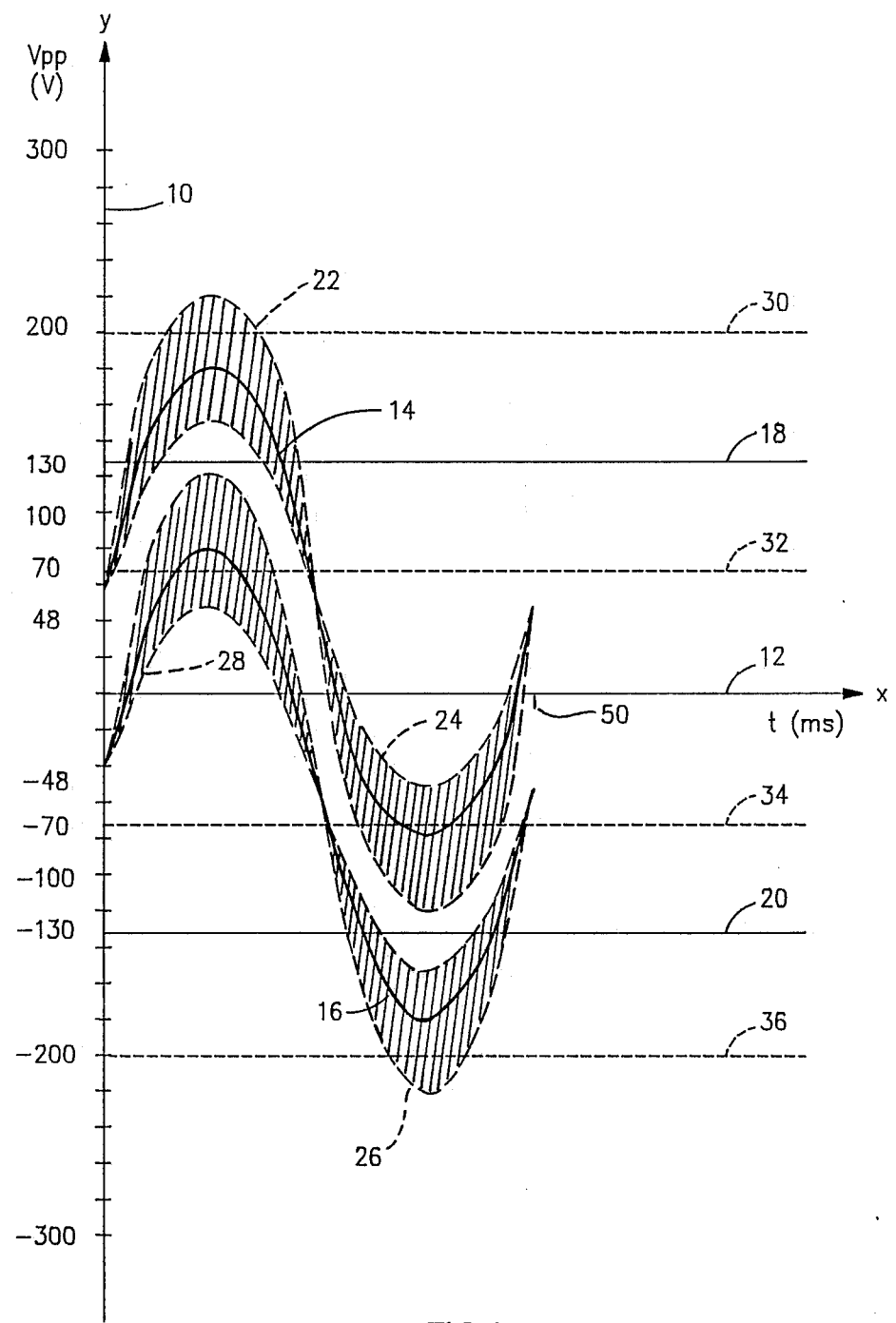
FIG. 1 is a graph illustrating voltages to be detected at a test access unit.
Figure 2:
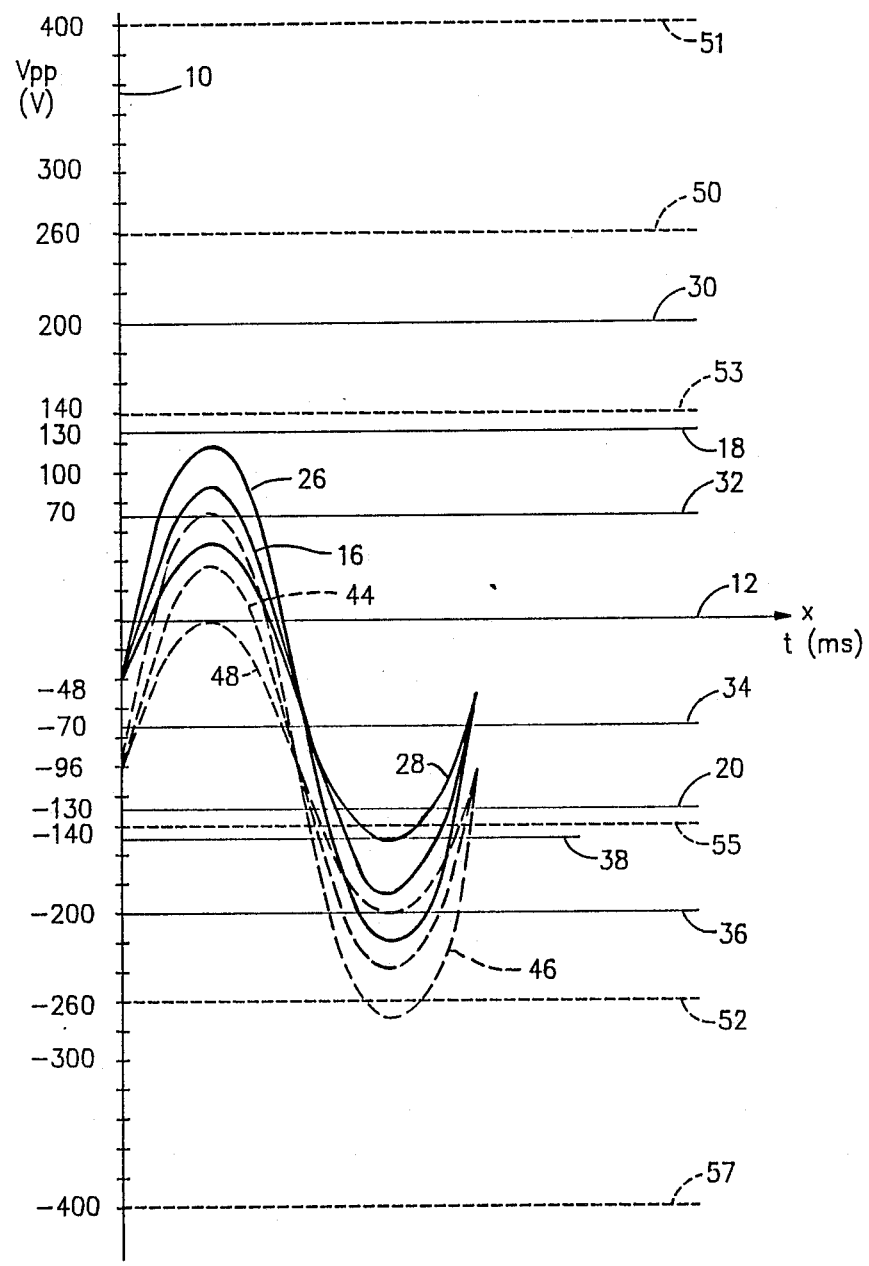
FIG. 2 is a graph illustrating positive and negative coin control voltages and a negative ringing voltage before and after the equalization stage of the present invention.

Referring to FIG. 2, an equalized negative ringing signal 44 ($-$Teq) is shown in dashed lines with its corresponding maximum and minimum signals 46 and 48 ($-$Teqmax and $-$Teqmin). As can be seen, $-$Teq is offset by $-$96 VDC, or an additional $-$48 VDC but has substantially the same peak-to-peak amplitude. This is the result of the selective amplification by the equalization circuit of the DC component of $-$T, or the $-$48 VDC battery voltage. The AC component (100 VRMS at 20 Hz) retains substantially the same peak-to-peak voltage level.

Positive and negative equalized coin control voltages 50 and 52 ($\pm$CCeq) are shown at $\pm$260 V respectively. Also shown are the coin control maximum, $\pm$CCeqmax, and minimum, $\pm$CCeqmin, values 51, 53, 55 and 57 at $\pm$400 VDC and $\pm$140 VDC. The values of $\pm$CCeq, $\pm$CCeqmax and $\pm$CCeqmin are twice their original values as result of a gain of two for DC components of the equalization circuit. Consequently, the equalized thresholds for detecting the coin control voltage can now be set at $\pm$140 V, or its minimum value. As can clearly be seen, a threshold may be set (e.g., at $-$140 VDC) such that only a reflective NTPI termination flag will be triggered if $-$T or $-$CC is present. The absorptive PTPI termination flag (for $-$T or $+$CC) may be set well above $-$Teqmax, thus eliminating the risk that it will be falsely triggered.

This results in a composite detection circuit which will detect a $-$Teq or a $-$CCeq to set the reflective NTPI termination. Alternatively, the circuit is able to detect a $+$Teq or a $+$CCeq to set the absorptive PTPI termination without the reflective NTPI termination flag being falsely tripped.

Figure 3:
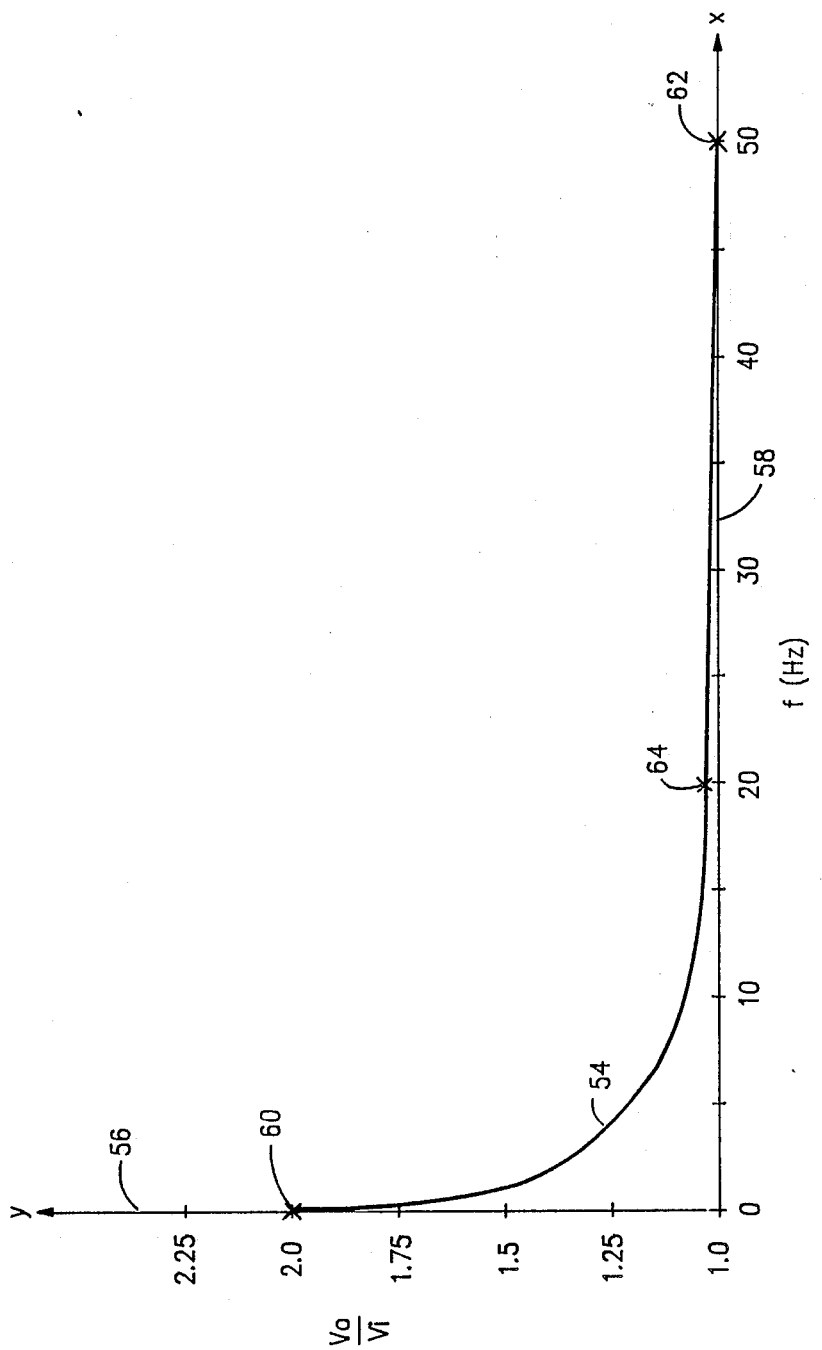
FIG. 3 is a graph illustrating the first stage gain equalization curve of the present invention.

The gain equalization curve 54 of the present invention is shown in the graph of FIG. 3. The gain of a first amplification stage, (Vo/Vi), is shown along the graph's vertical, or y, axis 56 with respect to frequency (in Hz) on the graph's horizontal, or x, axis 58. The equalization curve 54 ranges from a gain of two at 0 Hz (DC) at point 60 to a gain of one at point 62 (50 Hz). At 20 Hz (point 64), which is the nominal frequency value of the ringing voltage, the gain of the first stage of the circuit is approximately 1.04. Thus, the equalization stage of the present invention selectively amplifies the ±CC voltages 18 and 20 and the DC components of ringing voltages 14 and 16, while allowing the 20 Hz±R (±T) voltages 14 and 16 to remain at substantially the same peak-to-peak voltage level. Additionally, any slight variations of the frequency value of the ringing voltage will result in a correspondingly slight gain, thereby inhibiting false detections.

Figure 4:
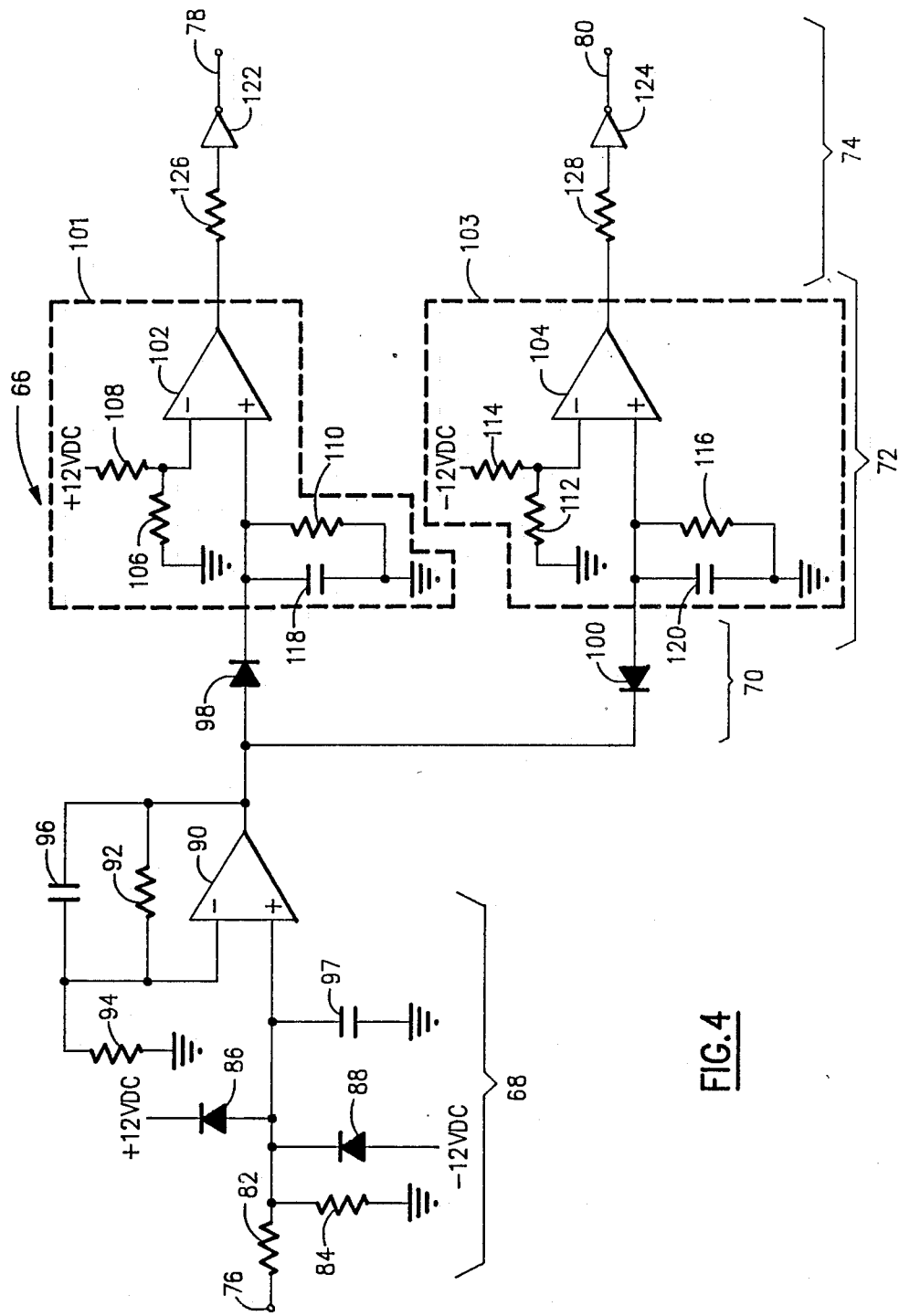
FIG. 4 is a schematic diagram of the detection circuit of the present invention.

As can be seen in FIG. 4, the composite ringing and coin control voltage detection circuit 66 of the present invention is comprised of four basic functional sections: (1) an input voltage conditioning section 68; (2) a polarity separation section 70; (3) a threshold detection section 72; and (4) a level translation section 74. These four sections work in unison to detect the positive and negative ringing and coin control voltages and provide an appropriate logic voltage so that a corresponding termination may be applied.

Each circuit 66 has a single input port 76 and two digital output ports 78 and 80, the first output port 78 providing an output corresponding to a detection of a positive ringing or coin control voltage and the second output port 80 providing an output corresponding to the detection of negative voltages. Thus, the detector requires two circuits such as circuit 66, one for each of the ring and tip lines to detect the appropriate voltages.

The input conditioning section 68 is utilized to condition the voltage to be detected. Two resistors 82 and 84 are used as a voltage divider to reduce the signal to a more manageable level. Diodes 86 and 88 provide overvoltage protection for an operational amplifier 90. Operational amplifier 90, resistors 92 and 94, and capacitor 96 function to selectively amplify the input voltage according to its frequency, as shown in the equalization curve of FIG. 3. Capacitor 97 is used to remove any high-frequency transients on input line 76.

The polarity separation section 70, which comprises diodes 98 and 100, acts to separate the positive and negative values of the input voltage and to provide to the threshold detection section 72 two signals, one of which comprises all of the positive values of the input voltage, and the other of which comprises all of the negative values. Thus, the threshold detection section 72, comprising positive and negative threshold detectors 101 and 103, is provided with two inputs. Each threshold detector 101 (103) comprises an operational amplifier 102 (104), three resistors 106, 108, 110 (112, 114, and 116), and a capacitor 118 (120). The voltage is applied to the non-inverting input of operational amplifier 102 and to the inverting input of operational amplifier 104. Each detector 101 (103) is configured to detect voltages at the appropriate voltage levels, approximately ±CCeqmin, or a level corresponding to two times ±CCmin by proper selection of resistors 106, 108 (112, 114).

The level translation section 74 converts the analog output of the operational amplifiers 102 and 104 of the threshold detection section 72 to TTL levels. The level translation section 74 utilizes an inverter 122 and 124 and a current-limiting resistor 126 and 128 for each of the two outputs 78 and 80. The TTL outputs facilitate an interface with other digital circuitry to set the appropriate terminations without software control.

A composite ringing and coin control voltage detection circuit 66 is used on both the ring and the tip lines. On the ring line, a +R at input 76 will cause an appropriate logic voltage at positive output 78 to indicate that an absorptive termination must be applied. Conversely, −R will cause the same logic voltage to appear at negative output 80 to indicate that a reflective termination must be applied. On the tip line, +T or +CC at input 76 will trigger a flag for an absorptive PTPI termination at output 78, while −T or −CC, alternatively, will trigger a reflective NTPI flag at output 80.

Thus, it can be seen that the composite detection circuit of the present invention is utilized on both the ring and the tip lines in a telephone circuit to detect either a positive or negative AC ringing voltage or a positive or negative DC coin control voltage. Because a simple composite circuit is used, bulky circuitry is not required and, additionally, the same circuit may be used on both lines. Furthermore, no software is required, thus saving engineering as well as processor time.

What is claimed is:

1. A composite detection circuit for use in the loop testing of a telephone system for detecting ringing voltages and coin control voltages on a telephone line, said circuit comprising:

an input terminal for connection to a telephone line for receiving an input voltage therefrom;

means connected to said input terminal for conditioning said input voltage, said conditioning means having an output for providing a conditioned voltage;

means for separating said conditioned voltage into positive and negative portions, said separating means having an input connected to said output of said conditioning means and positive and negative outputs for providing positive and negative portions of said conditioned voltage; and means for detecting when said positive and negative portions of said conditioned voltages exceed predetermined thresholds and for providing output voltages indicative thereof, whereby a voltage indicative of a positive voltage corresponds to a detected positive ringing or coin control voltage and a voltage indicative of a negative voltage corresponds to a detected negative ringing or coin control voltage, said detecting means having inputs connected to the outputs of said polarity separating means and first and second outputs for providing said indicative voltages.

2. A circuit as described in claim 1, wherein the input terminal is connected to a tip line of a telephone line pair for detecting ±ringing voltages and ±coin control voltages, said circuit further comprises:

a second input terminal for connection to a ring line of a telephone line pair for receiving an input voltage therefrom;

a second conditioning means connected to said second input terminal for conditioning said input voltage, said second conditioning means having an output for providing a second conditioned voltage;

a second separating means for separating said second conditioned voltage into positive and negative portions, said second separating means having an input connected to said output of said second conditioning means and positive and negative outputs for providing positive and negative portions of said second conditioned voltage; and means for detecting when said positive and negative portions of said conditioned voltage exceed predetermined thresholds and for providing output voltages indicative thereof, whereby a voltage indicative of a positive voltage corresponds to a detected positive ringing voltage and a voltage indicative of a negative voltage corresponds to a detected negative ringing voltage, said second detecting means having inputs connected to said outputs of said second separating means and first and second outputs for providing said indicative voltages.

3. A circuit as described in claim 1, wherein said conditioning means comprises a frequency selective amplifying means for selectively amplifying said input voltages in accordance with the frequency.

4. A circuit as described in claim 3, wherein said selective amplifying means comprises:
 an operational amplifier having non-inverting and inverting inputs and an output; and
 a frequency selective feedback means connected between said amplifier inverting input and said amplifier output, said non-inverting input being connected to said input terminal.

5. A circuit as described in claim 4, wherein said frequency selective feedback means comprises a capacitor connected between said amplifier inverting input and said amplifier output, a first resistor connected between said amplifier inverting input and said amplifier output, and a second resistor connected between amplifier inverting input and ground.

6. A circuit as described in claim 5, wherein said conditioning means further comprises a means for attenuating said input voltages.

7. A circuit as described in claim 6, wherein said attenuating means comprises a first resistor connected between said input terminal and said amplifier non-inverting input, and a second resistor connected between said amplifier non-inverting input and ground.

8. A circuit as described in claim 7, wherein said conditioning means further comprises means for providing overvoltage protection to said amplifier.

9. A circuit as described in claim 8, wherein said overvoltage protection means comprises first and second diodes, the cathode of said first diode being connected to a positive power supply and the anode of said first diode being connected to said amplifier non-inverting input, and the anode of said second diode being connected to negative power supply and the cathode of said second diode being connected to said amplifier non-inverting input.

10. A circuit as described in claim 9, wherein said separation means comprises positive and negative diodes, the anode of said positive diode being connected to said amplifier output and the cathode of said positive diode providing said positive output and the cathode of said second diode being connected to said amplifier output and the anode of said negative diode providing said negative output.

11. A circuit as described in claim 10, wherein said threshold detection means comprises positive and negative threshold detectors connected to said positive and negative outputs of said separating means.

12. A circuit as described in claim 11, wherein said positive and negative threshold detectors each comprise an operational amplifier, a first resistor being connected between a power supply and an input of said amplifier, and a second resistor being connected between ground and the same input of said amplifier.

13. A circuit as described in claim 12, wherein said detection circuit further comprises means for translating the level of said first and second outputs of said threshold detecting means to digital outputs, said level translating means having first and second inputs connected to said threshold detecting means first and second outputs and first and second outputs for providing digital indications of said detections.

14. A circuit as described in claim 13, wherein said level translating means comprises first and second inverters being connected to said first and second outputs of said first and second threshold detecting means.

15. A circuit as described in claim 1, wherein said separating means comprises positive and negative diodes, the anode of said positive diode being connected to said amplifier output and the cathode of said positive diode providing said positive output and the cathode of said second diode being connected to said amplifier output and the anode of said negative diode providing said negative output.

16. A circuit as described in claim 15, wherein said threshold detection means comprises positive and negative threshold detectors connected to said positive and negative outputs of said polarity separating means.

17. A circuit as described in claim 16, wherein said positive and negative threshold detectors each comprise an operational amplifier, a first resistor being connected between a power supply and an input of said amplifier, and a second resistor being connected between ground and the same input of said amplifier.

18. A circuit as described in claim 17, wherein said detection circuit further comprises means for translating the level of said first and second outputs of said threshold detecting means to digital outputs, said level translating means having first and second inputs connected to said threshold detecting means first and second outputs and first and second outputs for providing digital indications of said detections.

19. A circuit as described in claim 18, wherein said level translating means comprises first and second inverters being connected to said first and second outputs of said first and second threshold detecting means.

20. A circuit as described in claim 1, wherein said threshold detection means comprises positive and negative threshold detectors connected to said positive and negative outputs of said polarity separating means.

21. A circuit as described in claim 20, wherein said positive and negative threshold detectors each comprise an operational amplifier, a first resistor being connected between a power supply and an input of said amplifier, and a second resistor being connected between ground and the same input of said amplifier.

22. A circuit as described in claim 21, wherein said detection circuit further comprises means for translating the level of said first and second outputs of said threshold detecting means to digital outputs, said level translating means having first and second inputs connected to said threshold detecting means first and second outputs and first and second outputs for providing digital indications of said detections.

23. A circuit as described in claim 22, wherein said level translating means comprises first and second inverters being connected to said first and second outputs of said first and second threshold detecting means.

24. A method for composite detection of ringing voltage and coin control voltage in a telephone system, said method comprising the steps of:
 receiving an input signal from a telephone line;
 conditioning said input signal;
 separating said conditioned signal into positive and negative portions; and detecting when said positive and negative portions of said conditioned signals exceed specified thresholds and providing outputs indicative thereof.

25. A method as described in claim 24, wherein said conditioning step further comprises selectively amplifying said input signal.

26. A method as described in claim 25, wherein said input signal includes AC and DC components and said step of selectively amplifying selectively amplifies the DC components over the AC components, whereby DC coin control voltages can be detected at a higher threshold that is not tripped by ringing voltage levels.

27. A method as described in claim 26, wherein said conditioning step further comprises attenuating said input signal.

28. A method as described in claim 27, wherein said method of composite detection further comprises a translating step for translating the level of said indicative outputs to digital outputs.

29. A method as described in claim 24, wherein said conditioning step further comprises attenuating said input signal.

30. A method as described in claim 29, wherein said method of detection further comprises a translating step for translating the level of said indicative outputs to digital outputs.

31. A method as described in claim 24, wherein said method of detection further comprises a translating step for translating the level of said indicative outputs to digital outputs.

* * * * *